(12) United States Patent
Herrod

(10) Patent No.: US 8,156,388 B2
(45) Date of Patent: Apr. 10, 2012

(54) ANALYSIS LEADING TO AUTOMATIC ACTION

(75) Inventor: Allan Herrod, Mission Viejo, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 228 days.

(21) Appl. No.: 12/276,799

(22) Filed: Nov. 24, 2008

(65) Prior Publication Data

US 2010/0131792 A1    May 27, 2010

(51) Int. Cl.
*G06F 11/00*    (2006.01)
(52) U.S. Cl. ................. 714/57; 714/25; 714/48
(58) Field of Classification Search .............. 714/25, 714/46, 48, 57, 100
See application file for complete search history.

(56) References Cited

U.S. PATENT DOCUMENTS

| | | | |
|---|---|---|---|
| 4,514,846 A | 4/1985 | Federico et al. | |
| 6,681,222 B2 | 1/2004 | Kabra et al. | |
| 6,763,517 B2* | 7/2004 | Hines ............................. | 717/124 |
| 6,865,517 B2* | 3/2005 | Bantz et al. .................... | 702/188 |
| 6,892,317 B1 | 5/2005 | Sampath et al. | |
| 7,024,187 B2 | 4/2006 | Moles et al. | |
| 7,244,230 B2 | 7/2007 | Duggirala et al. | |
| 7,353,533 B2 | 4/2008 | Wright et al. | |
| 7,555,640 B2* | 6/2009 | Helvick ............................. | 713/1 |
| 7,698,275 B2 | 4/2010 | O'Brien et al. | |
| 7,734,287 B2 | 6/2010 | Ying | |
| 2002/0083164 A1* | 6/2002 | Katayama et al. ............. | 709/223 |
| 2002/0112041 A1 | 8/2002 | Viscount et al. | |
| 2004/0059920 A1 | 3/2004 | Godwin | |
| 2004/0128583 A1* | 7/2004 | Iulo et al. ........................ | 714/25 |
| 2004/0153841 A1 | 8/2004 | Beck | |
| 2004/0230835 A1 | 11/2004 | Goldfeder et al. | |
| 2005/0102534 A1 | 5/2005 | Wong | |
| 2005/0149564 A1 | 7/2005 | Jain et al. | |
| 2005/0197871 A1 | 9/2005 | Mendonca et al. | |
| 2005/0210331 A1* | 9/2005 | Connelly et al. ................ | 714/26 |
| 2005/0227683 A1 | 10/2005 | Draluk et al. | |
| 2006/0212771 A1* | 9/2006 | Fabbrocino ................... | 714/746 |
| 2007/0043525 A1 | 2/2007 | Brown et al. | |
| 2007/0276859 A1 | 11/2007 | Aravamudan et al. | |
| 2008/0046786 A1* | 2/2008 | Patel et al. ..................... | 714/100 |
| 2008/0047007 A1 | 2/2008 | Satkunanathan et al. | |
| 2008/0070495 A1 | 3/2008 | Stricklen et al. | |
| 2008/0244691 A1 | 10/2008 | Hilerio et al. | |
| 2009/0024663 A1 | 1/2009 | McGovern | |
| 2009/0204855 A1* | 8/2009 | Peters ............................. | 714/48 |

(Continued)

FOREIGN PATENT DOCUMENTS

EP    1655978 A1    5/2006

(Continued)

OTHER PUBLICATIONS

International Search Report and Written Opinion dated Apr. 23, 2010 in related case PCT/US2009/064507.

(Continued)

*Primary Examiner* — Joshua Lohn

(57) ABSTRACT

A system and methods for detecting an operational problem on a mobile device and automatically resolving the problem with a coordinated execution of repair tasks on the mobile device and on the plurality of servers communicatively connected to the mobile device providing for a complex solution to an operational problem. The system can archive a history of corrective actions and their outcome for later analysis and reporting.

20 Claims, 9 Drawing Sheets

U.S. PATENT DOCUMENTS

2010/0112997 A1     5/2010    Roundtree
2010/0138926 A1     6/2010    Kashchenko et al.

FOREIGN PATENT DOCUMENTS

WO           2005029294 A1     3/2005

OTHER PUBLICATIONS

Final Office Action mailed Oct. 27, 2011, in U.S. Appl. No. 12/263,265, Allan Herrod filed Oct. 31, 2008 in related case.

Office Action mailed Mar. 7, 2011, in U.S. Appl. No. 12/263,265, Allan Herrod filed Oct. 31, 2008 in related case.

International Search Report and Written Opinion for International Application No. PCT/US2010/039928 mailed on Oct. 14, 2010 in related case.

Office Action mailed Oct. 31, 2011, in U.S. Appl. No. 12/492,877, Allan Herrod filed Jun. 26, 2009 in related case.

Motorola: "Mobility Services Platform 3.2. User's Guide." Jun. 2008, XP002602863. Retrieved from the Internet: URL: https://docs.symbol.com/manuals/10015806d.pdf [retrieved on Sep. 29, 2010] cited in the application the whole document. in related case.

International Preliminary Report on Patentability and Written Opinion for International Application No. PCT/US2009/064507 mailed on May 24, 2011.

English language Abstract of European Patent Publication No. EP 0615188 (A1), European Patent Office, espacenet database—Worldwide (1994).

Non Final Office Action mailed Dec. 30, 2011, in U.S. Appl. No. 12/551,285, Allan Herrod, Filed Aug. 31, 2009.

* cited by examiner

ANALYSIS LEADING TO AUTOMATIC ACTION

TECHNICAL FIELD

The subject invention relates generally to device management systems, and more particularly to generating workflows to correct problems detected on a mobile device and coordinating the resolution of the problem between the mobile device and the server based device management system.

BACKGROUND

As the utility of mobile devices has increased, enterprises have deployed large numbers of mobile devices to meet the needs of their organization. The very nature of these mobile devices, the fact that they move around within the organization and in some cases leave the physical bounds of the organization, has led to an increasing number of problems for IT managers charged with supporting the mobile devices. These mobile devices include mobile computers, cordless telephones, cellular telephones, global positioning location systems, two-way radios, inventory devices and the like. The ability to communicate with these mobile devices has provided a level of available support but many problems require more complex analysis and resolution than current device management systems provide.

In another shortcoming of existing device management systems, the user is often the problem detection component of the mobile device for the device management system. In many cases, user behavior is to ignore problems until they become a complete impediment to the operation of the device and the user's ability to complete their daily work. Under these circumstances, problems that could have been resolved relatively easily are allowed to grow into larger issues requiring greater resources to resolve and longer device downtime for the user, thus reducing user productivity.

In another aspect, applications and communications between the mobile devices and the server systems are now complex enough that a coordinated effort between the mobile device and the server is required to resolve the problem. This can require coordination between the mobile device and the device management system on the server with respect to the order of the performance of actions such as one task on the mobile device must be completed before a companion task is run on the server then another task must run on the mobile device. Again, existing device management systems do not perform this coordination of problem repair operations between the mobile device and the device management system running on the server computer.

Further, a problem more difficult to detect is the case where the user adds additional components to the mobile device, removes required components from the device or reconfigures components to a state where they are incompatible with the enterprise network and/or the device management system. Current device management systems typically only validate that a particular component was installed on the mobile device initially, they do not validate that the components are currently completely installed and functioning correctly.

Accordingly, deficiencies in existing device management systems, desired cost savings of support and expected productivity improvements of users have created market demand for a device management system that can automatically detect problems on mobile devices at an early stage, coordinate complex repairs and report the corrective actions.

SUMMARY

The following presents a simplified summary in order to provide a basic understanding of some of the aspects described herein. This summary neither is an extensive overview nor intended to identify key or critical elements or to delineate the scope of the various aspects described herein. The sole purpose of the summary is to present some concepts in a simplified form as a prelude to the more detailed description presented later.

The disclosure describes systems and methods for defining workflows for a device management system. The workflows will detect problems on a mobile device or the server system, analyze the problem to determine the root cause and generate a task list to execute to resolve the problem. After generating the task list, the device management system can divide the tasks between the mobile device and the server. The device management system, typically running on the server computer, can then coordinate execution of the tasks on the disparate computers. The device management system need not necessarily run on the server receiving the corrective action and the device management system can apply the same corrective action to more than one mobile device, even performing the repairs on a plurality of mobile devices simultaneously.

The device management system can archive the generated workflows and their associated tasks as object-oriented entities and reuse them later for similar problems. Further, the device management system can create new workflows by combining archived workflows or selecting specific tasks from different workflows and creating a new workflow to address a particular problem.

In another aspect, the device management system can schedule workflows to run automatically base on a scheduled time or the occurrence of a preconfigured event. Generated workflows can vary in complexity based on the detected problem. For example, the device management system can schedule a simple workflow to run once a week and verify that the required applications on one or more mobile devices are installed and functioning properly.

A more complex workflow involves the device management system scheduling a regular communication to the device and evaluating the performance of the communications. If the device management system determines the communications are substandard, the device management system can execute a workflow task on the mobile device to confirm, and adjust if necessary, the mobile device communication parameters. The device manager system can also embed a workflow task on the mobile device that automatically resets the communication parameters to preconfigured values should the user or an application change the communication parameters and impair communications with the device management system.

In a very complex workflow, the device management system could deploy software upgrades to the mobile device requiring coordination between the mobile device and the device management system and resulting in synchronized tasks performed in turn on the mobile device and the device management system. In this example, the device management system initiates the execution of the workflow based on the event of the release of new versions of the operating system or the installed applications.

To the accomplishment of the foregoing and related ends, certain illustrative aspects are described herein in connection with the following description and the annexed drawings. These aspects are indicative of various ways to practice the invention, all of which are intended to be covered herein. Other advantages and novel features may become apparent from the following detailed description when considered in conjunction with the drawings.

DETAILED DESCRIPTION

Figure 1:
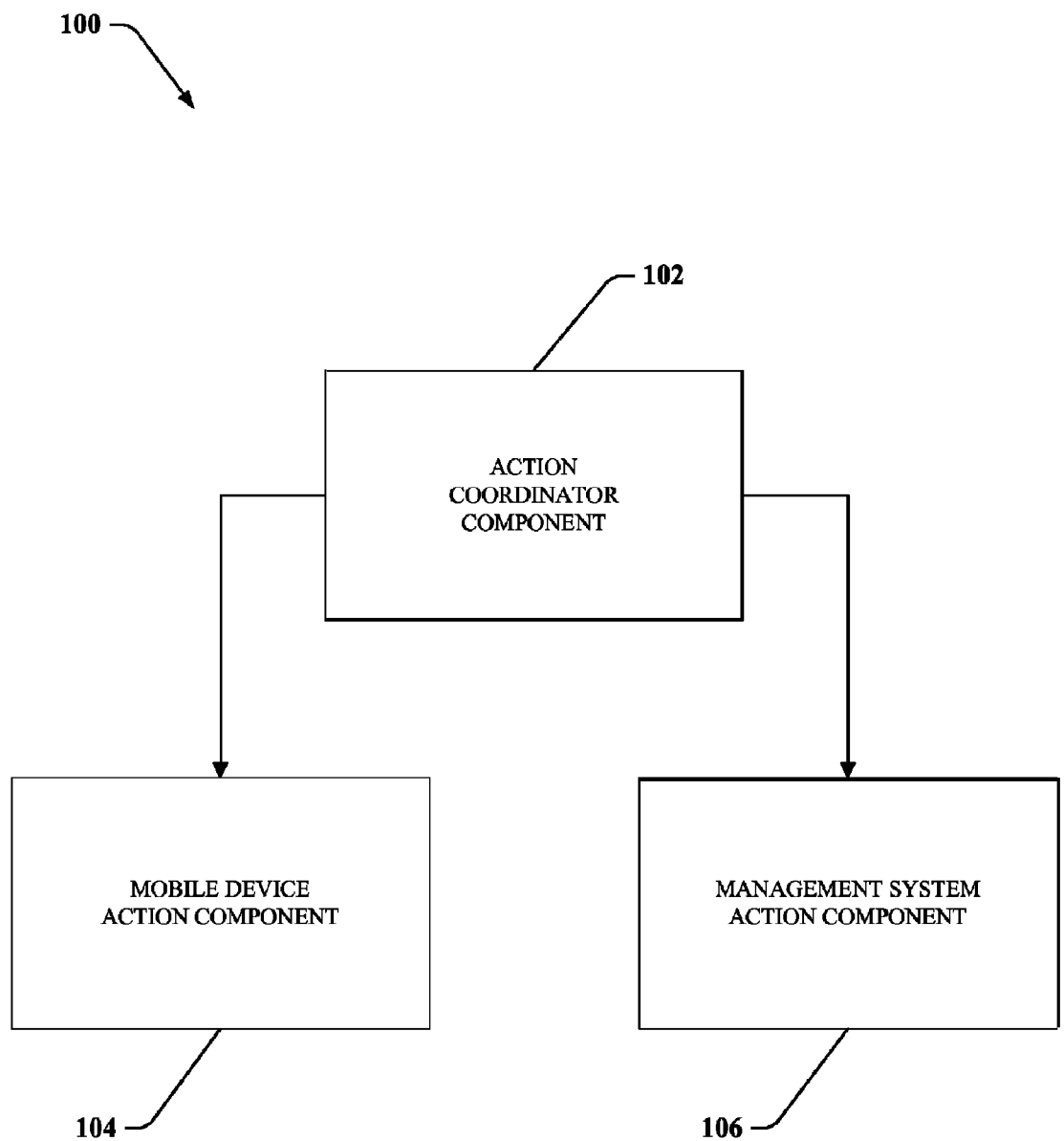
FIG. 1 illustrates an embodiment of the analysis leading to automatic action system.

Various embodiments are now described with reference to the drawings. In the following description, for purposes of explanation, numerous specific details are set forth in order to provide a thorough understanding of one or more embodiments. It may be evident, however, that the various embodiments can be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers.

The word "exemplary" as used herein means serving as an example, instance, or illustration. Any aspect or design described herein as "exemplary" is not necessarily to be construed as preferred or advantageous over other aspects or designs.

Furthermore, the one or more embodiments can be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that computer communication media includes a carrier wave that can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope of the disclosed embodiments.

Various embodiments are presented in terms of systems that can include a number of components, modules, and the like. It is to be understood and appreciated that the various systems can include additional components, modules, etc. and/or cannot include all of the components, modules, etc. discussed in connection with the figures. A combination of these approaches may also be used.

FIG. 1 is a block diagram overview of the analysis leading to automatic action system 100. The analysis leading to automatic action system 100 comprises an action coordinator component 102, a mobile device action component 104 and a management system action component 106. The action coordinator component 102 receives information from either the mobile device action component or the management system action component indicating the detection of a problem on the mobile device or the server. The action coordinator component 102 analyzes the information and generates a workflow to correct the problem. Depending on the specific details of the problem, the tasks embedded in the workflow can execute entirely on the mobile device, entirely on the server or partially on the mobile device and partially on the server.

In the circumstances where the action coordinator component 102 divides the tasks between the mobile device action component 104 and the management system action component 106, the action coordinator component 102 oversees the execution of the tasks, coordinating the point at which any given task executes and passing required information form a completed task to a task waiting to execute.

Further, the action coordinator component 102 archives the generated workflows for later use as a whole or for subdivision for the generation of other workflows capable of resolving different problems detected on the mobile device or the server. The action coordinator component also collects status reports from the mobile device action component 104 and the management system action component 106 for reporting problem resolution to network managers and for logging to a database to data mine in the future for network communication improvements.

Mobile device action component 104 provides the ability for the mobile device to automatically detect problems occurring on the mobile device and inform the action coordinator component 102 of the detected problem. If the mobile device is unable to communicate with the server and the action coordinator component 102 then the mobile device action component 104 can archive the information associated with the problem description for later transmission. The mobile device action component 104 can then initiate a preconfigured communications recovery routine, provided as a workflow from the action coordinator component 102, to attempt to reestablish communications with the server and the action coordinator component 102. Once communications are reestablished, the mobile device action component 104 can transmit any archived problem reports to the server and the action coordinator component 102.

Further, mobile device action component 104 can monitor the mobile device and produce efficiency reports based on the mobile device utilization. The mobile device action component 104 can transmit the efficiency reports to the action coordinator component 102 for review. If the action coordinator component 102 determines that a decrease in efficiency is suspect then the action coordinator component 102 generates a workflow to diagnose the state of the mobile device and sends the workflow to the mobile device with instructions for immediate execution. The mobile device action component then executes the workflow to determine if any of the application components are improperly configured or if any of the communication parameters are set to inappropriate values. The mobile device action component 104 then forwards the results of the investigation to the action coordinator component and, if necessary, executes further transmitted workflows to correct the efficiency problem.

Management system action component 106 provides the ability for the server computer to detect problems on the server computer or on one or more mobile devices. In one aspect, the management system action component 106 perceives activities on many similar mobile devices and uses this view to detect that a particular mobile device could be having a problem because its behavior is inconsistent with the behavior of the other similarly situated mobile devices. For example, the communication rate with one of a series of mobile devices is significantly below the communication rate of all the other mobile devices. The management system action component 106 interprets this as a problem associated with the communication configuration of the mobile device or the beginning of a hardware failure in the mobile device's communication hardware.

The management system action component 106 reacts to this problem detection by reporting a problem for this mobile device to the action coordinator component 102. The action coordinator component analyzes the problem report and then generates a workflow to further investigate and resolve the communication issue on the mobile device. The action coordinator component 102 then distributes the workflow, as necessary, between the mobile device action component 104 and the management system action component 106. The mobile device action component 104 and the management system action component 106 execute the workflow, coordinating task execution, as necessary, at the command of the action coordinator component 102 and reporting the results of the workflow execution back to the action coordinator component.

Management system action component 106 can archive the problem reports and the generated workflows for future use. Further, the management system action component can compile reports based on the activities associated with resolving the mobile device problems and distribute the reports to a preconfigured list of individuals. Similar to the workflow generations, the report generations can occur based on a scheduled time and date and on the occurrence of a preconfigured event. Preconfigured events include but are not limited to mobile device loss of communication, mobile device degradation of utilization efficiency, installation of unauthorized applications on mobile devices, removal of authorized applications from mobile devices or manual changes of configuration parameters on mobile devices.

Figure 2:
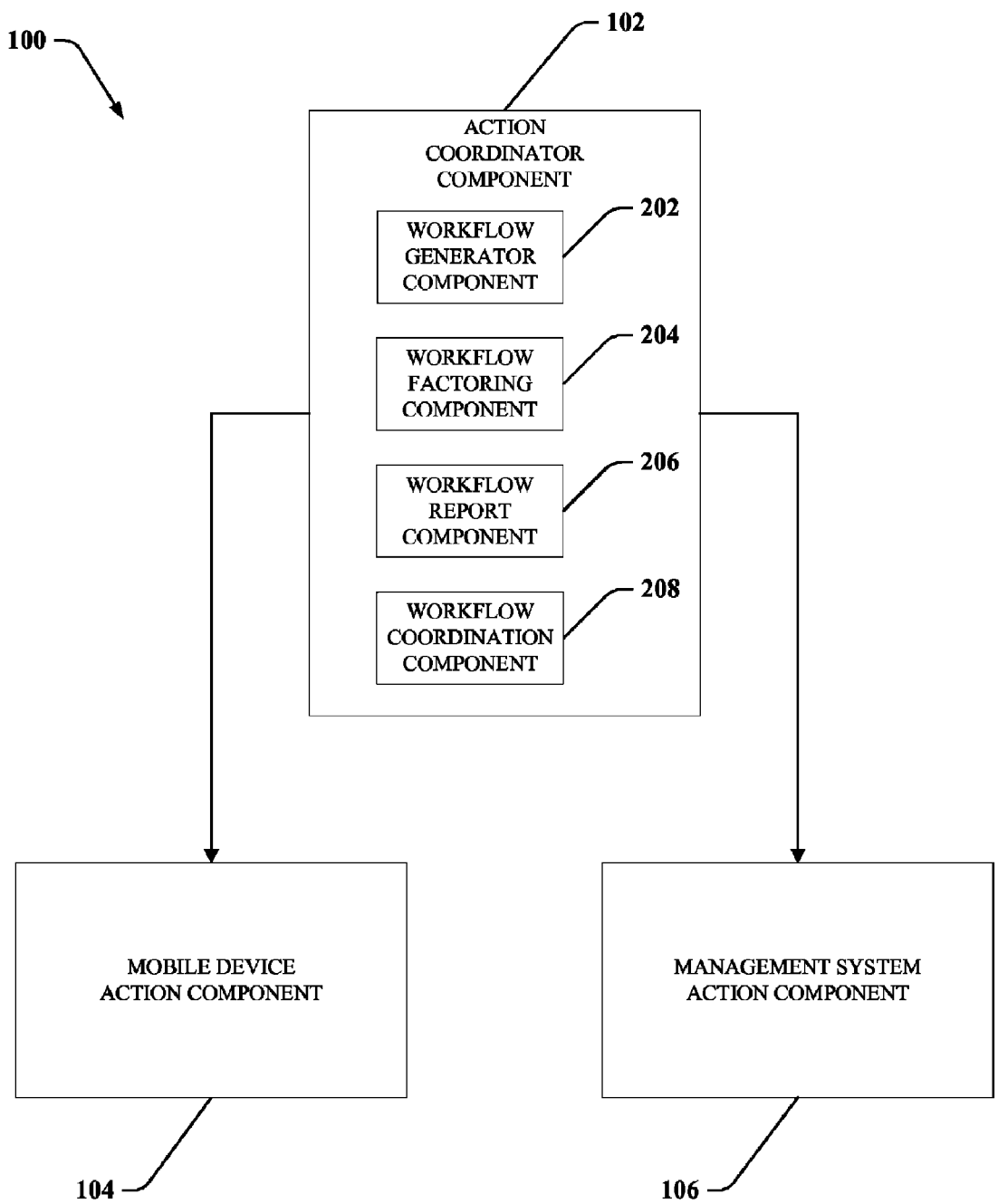
FIG. 2 illustrates an embodiment of the analysis leading to automatic action system and the associated action coordinator components.

FIG. 2 depicts an action coordinator component 102 comprising the workflow generator component 202, the workflow factoring component 204, the workflow report component 206 and the workflow coordination component 208. The workflow generator component 202 provides the ability to receive information and problem reports from the mobile device action component and the management system action component, analyze the information and problem reports to determine a path of corrective action and generate the workflow to traverse the path and resolve the mobile device or server problem.

In some cases, the workflow generator component 202 creates new workflows to address a new problem. In another case, the workflow generator component 202 selects an existing workflow from the workflow archive to address the reported problem. In other cases, the workflow generator component 202 selects tasks from existing workflows and combines them with possibly new tasks to generate a workflow to resolve a particular problem. It should be noted that other combinations of existing tasks and workflows combined with new tasks and workflows are possible and included in this disclosure.

In another aspect of the subject invention, the workflow generator component can generate workflows for optimizing operation of the mobile device and/or the server computer. For example, the user can configure the action coordinator component to automatically execute a workflow factored for the mobile device and the server that monitors the user's use of the device with respect to typical usage patterns based on the time of day and the day of the week. The workflow then creates a usage schedule and makes a determination of when the mobile device and the associated server applications are in an expected idle state. Once a reliable pattern of idle states is determined, the workflow generator schedules a workflow during these idle periods to perform maintenance on the mobile device and the associated server applications such as installing new versions of required applications or upgrading system components to newer versions.

In another example, the mobile device can support more than one type of network communication medium. The workflow generator component can create a workflow to monitor the performance of the communications for each supported network and generate a prioritized list for the network types based on communication efficiency. The mobile device will then attempt to use the highest priority communication network based on the generated list. If the selected network type becomes unavailable then the mobile device will automatically attempt communications with the next network type from the prioritized list.

In another aspect of the innovation, a workflow factoring component 204 provides the ability to parse an existing workflow into tasks for execution on one or more servers and tasks for execution on one or more mobile devices. For example, if an access point becomes overloaded by a plurality of mobile devices because of improper communication configuration on the mobile devices, the workflow factoring component 204 can factor a workflow to correct the improper configuration. Each mobile device can have different requirements for correction, based on factors such as operating system, communication protocols, etc. Further, the order of operation for correcting the errant configuration requires coordination of the modification of the mobile devices before any change to the access point supporting communication to the server. The workflow factoring component 204 determines the appropriate location for the execution of the associated task and delivers the factored task list to the appropriate location. The workflow factoring component 204 then forwards the factored task lists to the workflow coordination component 208 so the tasks are executed in the proper sequence. The workflow factoring component 204 performs the factoring automatically based on the identified problem and the prescribed resolution and can re-factor the workflow and deliver an updated task list based on changes to the mobile device as the tasks are executed on the mobile device or the server computer.

The workflow report component 206 provides the ability to report useful information and status related to the problems resolved by the analysis and automatic actions performed by the analysis leading to automatic action system 100. The user can pre-configure the reports for delivery to the appropriate individuals based on a scheduled time and date or based on the occurrence of a pre-configured event. For example, the user can schedule the generation and delivery of a problem resolution report to management personnel each time the action coordinator component 102 receives notification that a mobile device problem is resolved. The workflow report component 206 archives generated reports for later review and analysis to investigate systemic problems and to improve the overall efficiency of the enterprise mobile device architecture.

The workflow coordination component 208 provides the ability to synchronize the execution of the tasks executing on the different machines allowing the problem resolution to proceed in an ordered fashion. For example, a particular problem resolution can require a first task executed on the mobile device and the workflow coordination component 208 must provide the results of the task, task completion and/or data, to a second task executing on a server machine prior to the execution of the second task. Once the second task has completed execution the workflow coordination component can synchronize the completion and/or data of the second task with the remaining tasks on the mobile device if necessary to assure that all of the tasks are coordinated in their execution so the problem resolution is successful.

Further, should additional problems develop during the execution of a workflow or should further analysis during the workflow execution indicate that more tasks are required or a change in execution order of the existing tasks is required, the workflow coordination component 208 can accommodate the change. The workflow coordination component 208 can pause the task list currently executing on the mobile device and/or the server and update the task list of each by reordering tasks, adding tasks or deleting tasks. If necessary, the workflow coordination component can delete the existing task list on the mobile device and/or the server computer and transmit an entirely new task list for execution.

Figure 3:
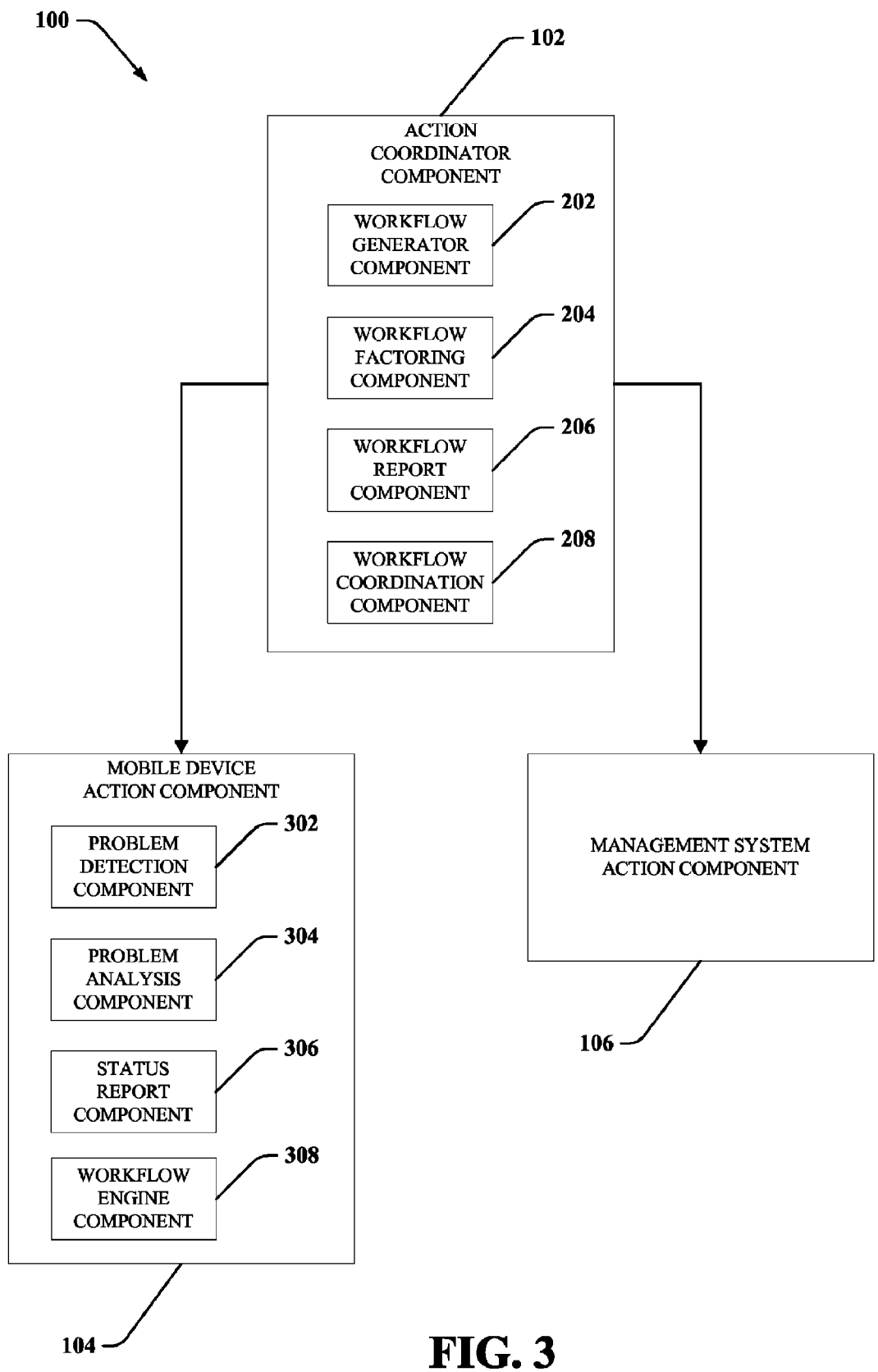
FIG. 3 illustrates an embodiment of the analysis leading to automatic action system and the associated mobile device action components.

FIG. 3 depicts a mobile device action component comprising a problem detection component 302, a problem analysis component 304, a status report component 306 and a workflow engine 308. The problem detection component 302 provides the ability for automatic detection of problems as they occur on the mobile device. For example, the problem detection component 302 can notice a loss of communications between the mobile device and the server. After detecting the loss of communications, the problem detection component 302 communicates the problem detection information to the problem analysis component 304 for further analysis.

In another aspect, the problem detection component 302 has a manual input user interface allowing manual specification by the user of the perceived problem to the problem detection component 302. The problem detection component then forwards the user entered problem information to the problem analysis component 304 for further review.

Further, the user can configure the problem detection component 302 for periodic determination of any or all of the installed applications and system components with respect to proper installation and function. The problem detection component collects information regarding the presence of the application or system component on the device and performs pre-configured tests designed to determine if the application or system component is functioning properly. Upon completion of the information collection process, the problem detection component 302 forwards the information and test results to the problem analysis component 304 for further processing.

The problem analysis component 304 provides the ability to analyze the data delivered by the problem detection component 302 and make a determination if a problem actually exists and requires a workflow solution by the action coordinator component 102. In some cases the problem analysis component 304 cannot make the determination based on the information initially provided by the problem detection component 302 and must request additional information from the problem detection component 302. In any case, once the problem analysis component has sufficient information to determine that a problem requires resolution then the problem analysis component forwards the problem specification and data to the action coordinator component 102 for generation of a workflow solution.

In another aspect, the problem analysis component 304 can provide additional information as the problem evolves or as the workflow engine 308 executes the provided workflow solution. If updated information becomes available then the problem analysis component performs another analysis of the information and updates the action coordinator component 102 with the results of the updated analysis. Similarly, if a determination is made that the problem has subsided, then the problem analysis component 304 can inform the action coordinator component that the problem is no longer an issue and cancel the outstanding workflow execution. For example, the user can transport the mobile device temporarily out of communication range and simulate a communications failure problem. Once the problem analysis component 304 determines this is not a problem with the mobile device communication system then the problem analysis component 304 can update the action coordinator component 102 and cancel the executing workflow attempting to correct the communication problem.

The status report component 306 provides the ability to inform the action coordinator component 102 of the results of the problem resolution workflow provided by the action coordinator component 102. The status report component can provide reports in both an interim form and in a final form. The interim form provides status reports based on individual task completion on the mobile device. The final form provides a status report on the state of the problem resolution after all the workflow engines complete all the tasks of the workflow on both the mobile device and the server. The status report component 306 communicates the reports from the mobile device to the action coordinator component on the server and can then be distributed to appropriate individuals or archived for future reference.

The workflow engine component 308 provides the ability to execute workflow tasks as part of the overall problem solution. The workflow engine component receives a task list from the workflow factoring component 204 for execution. The task list contains additional information related to the requirement of synchronization for the tasks. For example, the first task can be designated as execute immediately so the workflow engine component 308 executes the first task upon receiving the task list. The workflow coordination component can designate the second task as wait for notice from the workflow coordination component 208 so the workflow engine component completes the first task and pauses until receiving instructions from the workflow coordination component 208.

The instructions can advise the workflow engine component 308 to simply execute the next task, provide included data to the next task, skip the next task, rearrange the order of the remaining tasks, etc. At the completion of execution of each task, the workflow engine component notifies the status report component 306 and returns appropriate information and status to the action coordinator component 102 and specifically the workflow generator component 208.

In another aspect, the workflow coordination component 208 can instruct the workflow engine component 308 to perform diagnostic procedures targeted at collecting additional information to aid in understanding and resolving a problem on a mobile device. For example, the workflow coordination component 208 can instruct the workflow engine component 308 to ping the server computer and transmit a large simulated known data packet to the server to confirm that reliable communications are available.

Figure 4:
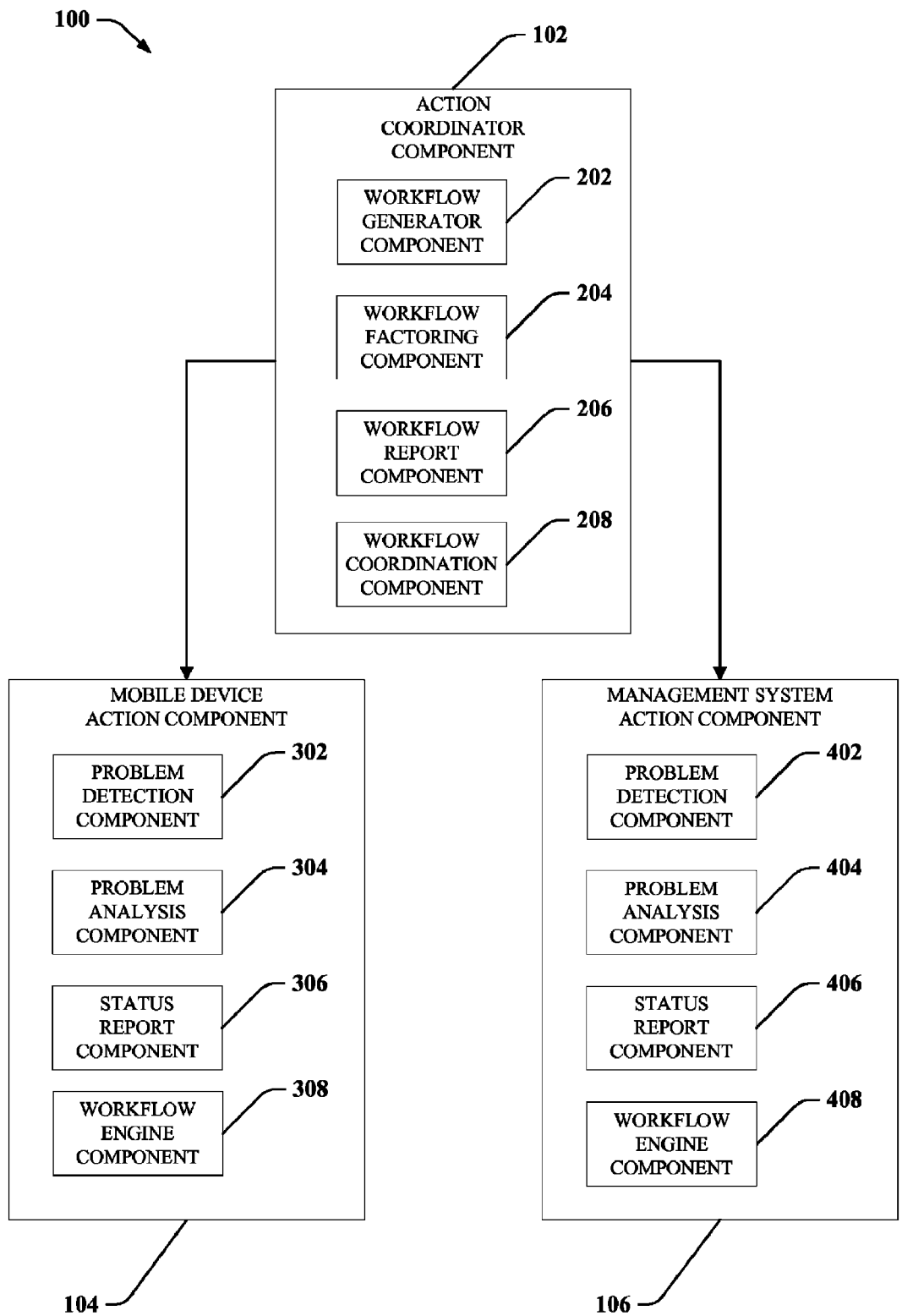
FIG. 4 illustrates an embodiment of the analysis leading to automatic action system and the associated device management system's action components.

FIG. 4 depicts a management system action component 106 comprising a problem detection component 402, a problem analysis component 404, a status reporting component 406 and a workflow engine 408. It should be noted that the management system action component 106 and the mobile action component 104 perform similar functions. The mobile action component 104 performs these operations only on the mobile device while the management system action component perform these same operations on either the mobile device through the communications link or on the server computer.

The problem detection component 402 provides the ability for automatic detection of problems as they occur on the server or on the mobile device. For example, the problem detection component can notice a decrease in efficiency of a networked application running cooperatively on the server and the mobile device. The problem detection component can interrogate the application on both devices for configuration parameters and provide the configuration information to the problem analysis component 404 for determination of the problem.

In another aspect, the problem detection component 402 has a manual input user interface allowing manual specification by the user of the perceived problem to the problem detection component 402. The problem detection component then forwards the user entered problem information to the problem analysis component 404 and the problem analysis component 304 for further review.

Further, the user can configure the problem detection component 402 for periodic determination of any or all of the installed applications and system components with respect to proper installation and function. The problem detection component 402 collects information regarding the presence of the application or system component on the device and performs pre-configured tests designed to determine if the application or system component is functioning properly. Upon completion of the information collection process, the problem detection component 402 forwards the information and test results to the problem analysis component 304 and problem analysis component 404 for further processing.

The problem analysis component 404 provides the ability to analyze the data delivered by the problem detection component 302 and problem detection component 402 and make a determination if a problem actually exists and requires a workflow solution by the action coordinator component 102. In some cases the problem analysis component 404 cannot make the determination based on the information initially provided by the problem detection component and must request additional information from the problem detection component 302 and/or problem detection component 402. In any case, once the problem analysis component 404 has sufficient information to determine that a problem requires resolution then the problem analysis component 404 forwards the problem specification and data to the action coordinator component 102 for generation of a workflow solution.

In another aspect, the problem analysis component 404 can provide additional information as the problem evolves or as the workflow engine 408 executes the provided workflow solution. If updated information becomes available then the problem analysis component 404 performs another analysis of the information and updates the action coordinator component 102 with the results of the updated analysis. Similarly, if a determination is made that the problem has subsided, then the problem analysis component 404 can inform the action coordinator component that the problem is no longer an issue an cancel the outstanding workflow execution.

For example, the user can transport the mobile device from a first production environment where the device is configured and functions properly to a second production environment where the device is unable to function because of different requirements of the second production environment. The problem analysis component 404, after receiving this information from the problem detection component 402, can provide the information to the workflow generator component 202 and the action coordinator component will generate a workflow to resolve the problem. For example, the workflow factoring component 204 would factor the reconfiguration into a task list for the mobile device and a task list for the server. The mobile device task list would reconfigure the communications parameters and the applications to match the second production environment. This can include installing additional applications required to work effectively in the second production environment. Similarly, the server task list would reconfigure the server security and access rights so the mobile device could access the data necessary to use the newly installed application.

The status report component 406 provides the ability to inform the action coordinator component 102 of the results of the problem resolution workflow provided by the action coordinator component 102. The status report component 406 can provide reports in both an interim form and in a final form. The interim form provides status reports based on individual task completion on the mobile device. The final form provides a status report on the state of the problem resolution after all the workflow engines complete all the tasks of the workflow on both the mobile device and the server. The status report component 406 communicates the reports from the local server to the action coordinator component on the same or different server and can then be distributed to appropriate individuals or archived for future reference.

The workflow engine component 408 provides the ability to execute workflow tasks as part of the overall problem solution. The workflow engine component receives a task list from the workflow factoring component 204 for execution. The task list contains additional information related to the requirement of synchronization for the tasks. For example, the first task can be designated as execute immediately so the workflow engine component 408 executes the first task upon receiving the task list. The workflow coordination component 208 can designate the second task as wait for notice from the workflow coordination component 208 so the workflow engine component 408 completes the first task and pauses until receiving instructions from the workflow coordination component 208.

The instructions can advise the workflow engine component 408 to simply execute the next task, provide included data to the next task, skip the next task, rearrange the order of the remaining tasks, etc. At the completion of execution of each task, the workflow engine component 408 notifies the status report component 306 and returns appropriate information and status to the action coordinator component 102 and specifically the workflow generator component 208.

In another aspect, the workflow coordination component 208 can instruct the workflow engine component 408 to perform diagnostic procedures targeted at collecting additional information to aid in understanding and resolving a problem on the mobile device or the server. For example, the workflow coordination component 208 can instruct the workflow engine component 408 to reduce the communication rate between the mobile device and the server to determine if out of buffer error routines are functioning properly by forcing communications faster than the transport layer can move the data from one device to another.

Figure 5:
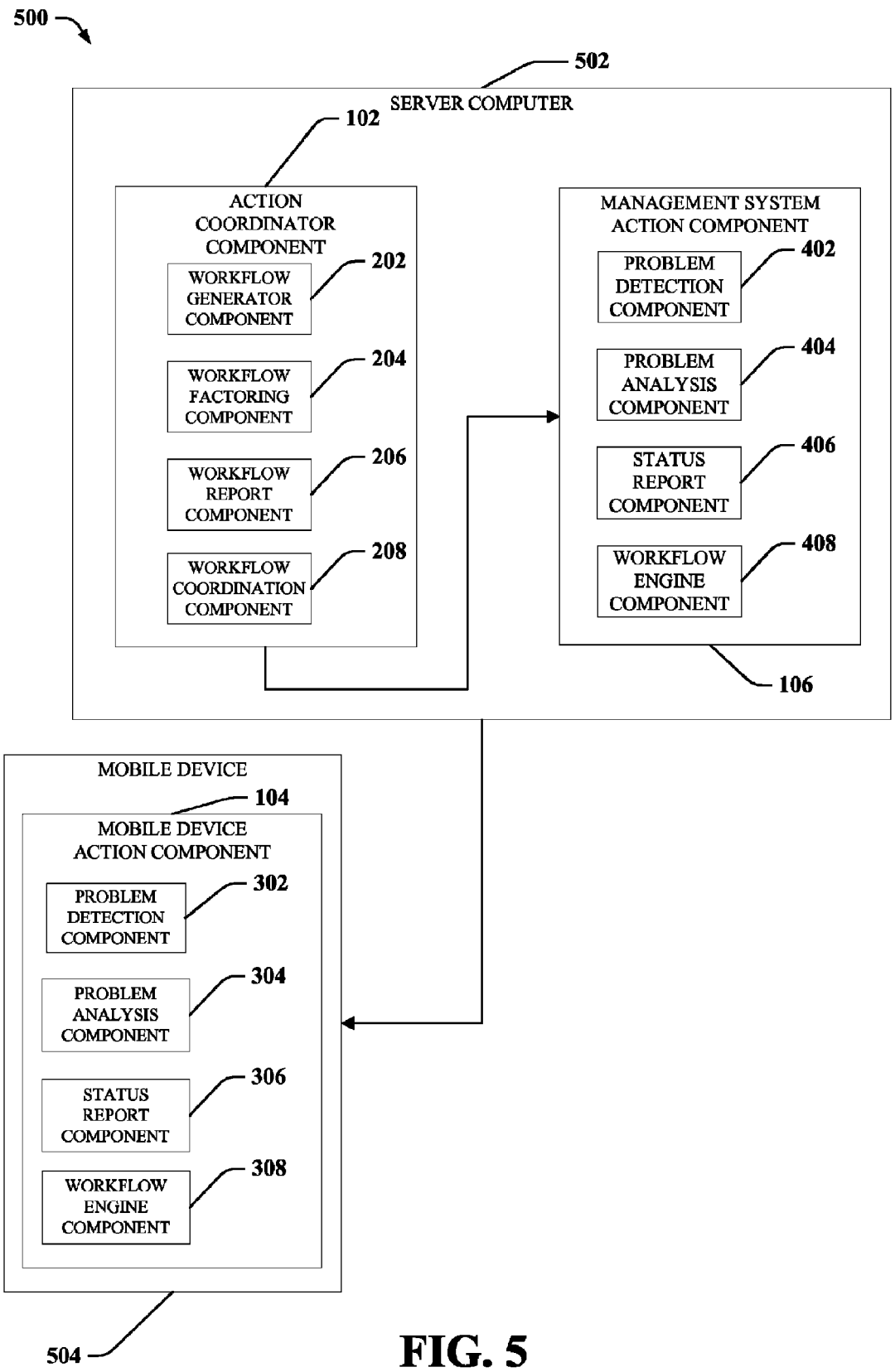
FIG. 5 illustrates an embodiment of the analysis leading to automatic action system with the associated device management system and the action coordinator component implemented on the same server.

Referring now to FIG. 5, the server computer 502 illustrates that the management system action component 106 and the action coordinator component 102 can reside on the same computer although this is not a requirement. Further, multiple action coordinator components 102 can exist on a network and interact with each other to distribute the load of supporting a large number of mobile devices. Multiple action coordinator components 102 can also function in a redundant capacity providing for failover support of the mobile devices of a failed action coordinator component 102 by another action coordinator component 102.

Figure 6:
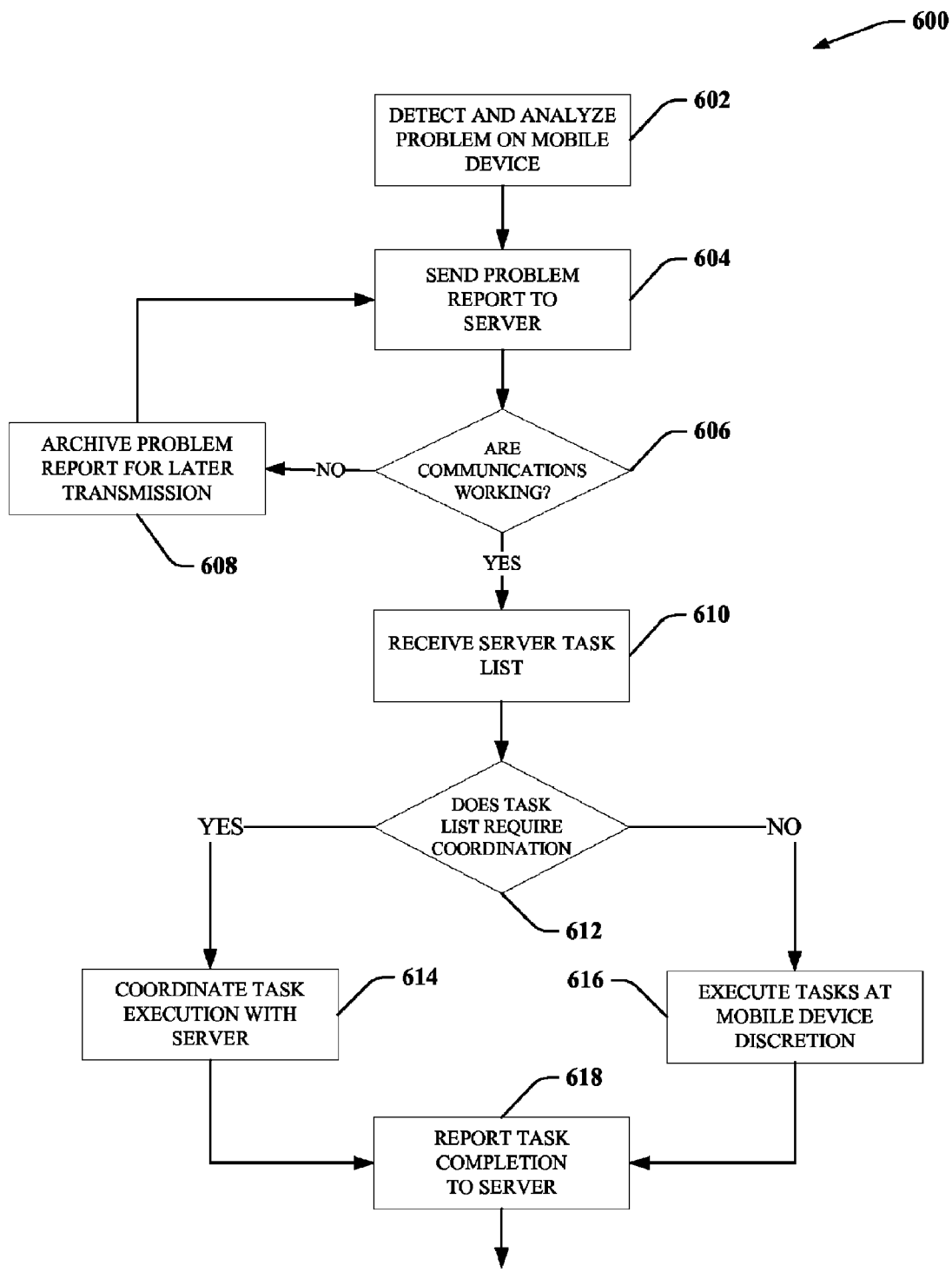
FIG. 6 illustrates an embodiment of a method of a mobile device detecting a problem on the mobile device and interacting with action coordinator component on the server.

Looking to FIG. 6, illustrated is a method 600 of resolving a problem on a mobile device detected by the mobile device. Beginning at step 602, a detection component 302 detects a problem on the mobile device. Based on the analysis of the detected problem, a report of the details of the problem is prepared for transmission to the action coordinator component 102 on the server. At step 604, the mobile device attempts to send the problem report to the server for further analysis and workflow generation.

Next, at step 606, a determination is made concerning the communications between the mobile device and the action coordinator component 102 on the server. If communications between the mobile device and the server are unavailable then the method proceeds to step 608 where a problem report is archived for transmission as soon as communication capabilities are restored. If the mobile device successfully transmits the problem report to the server, then the method proceeds to step 610 where the factored task list is sent to the mobile device for execution.

Proceeding at step 612, the mobile device determines whether the provided task list requires coordination with the remainder of the workflow task list factored to the server. If the task list requires coordination, then the method proceeds to step 614 where the provided task list is interrogated to determine the synchronization steps the mobile device must follow. If the task list does not require synchronization then the method proceeds to step 616 where the mobile device executes the tasks sequentially without waiting for any further communication from the server. In either case, once the mobile device completes execution of the task list, the method proceeds to step 618 where the mobile device prepares the task execution status report and transmits the report to the server.

Figure 7:
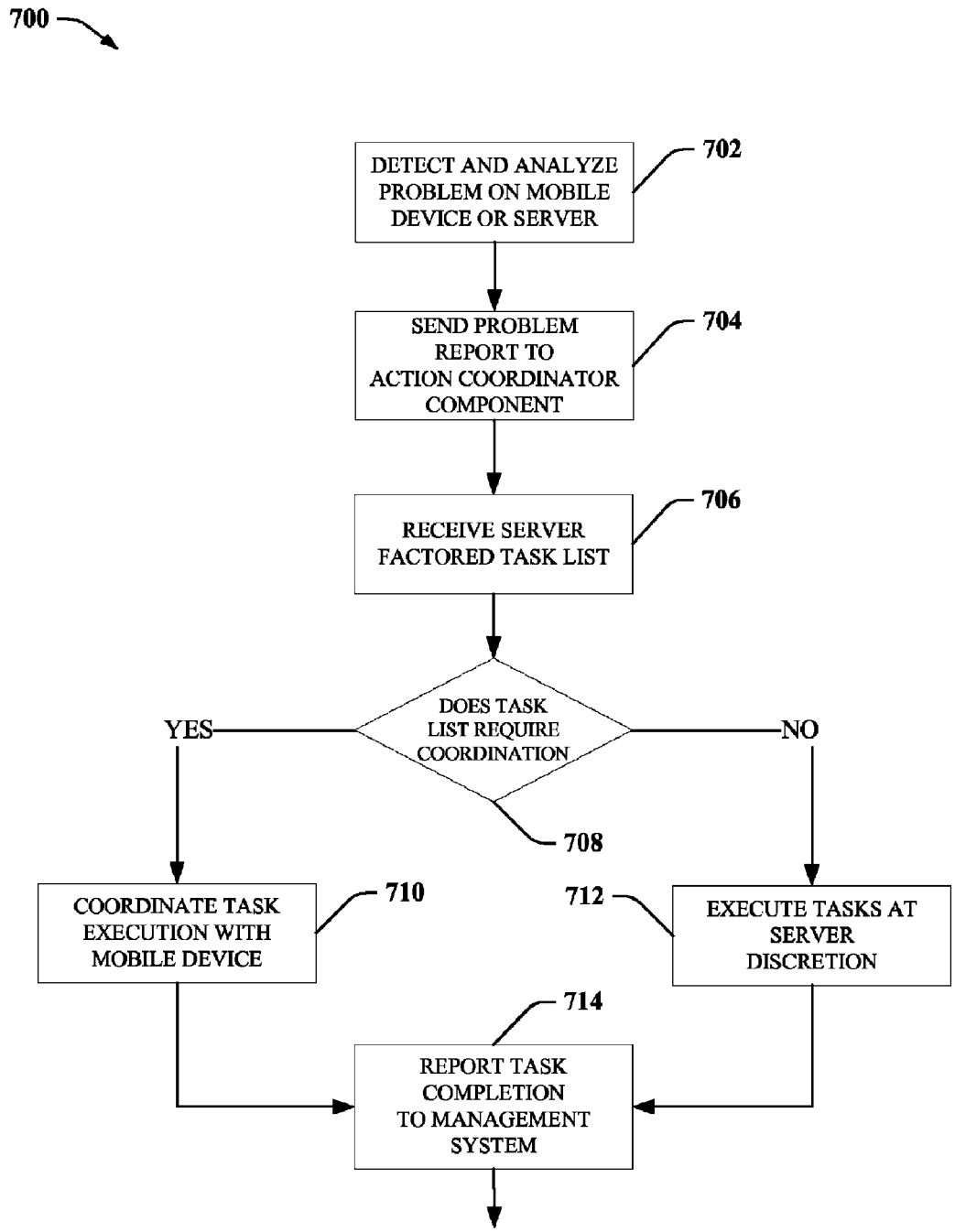
FIG. 7 illustrates an embodiment of a method of device management system detecting a problem on the server or the mobile device and interacting with the action coordinator component on the server.

Referring now to FIG. 7, illustrated is a method 700 of resolving a problem on a mobile device or a server detected by the server. Beginning at step 702, a detection component 402 detects a problem on the mobile device and/or the server. Based on the analysis of the detected problem, a report of the details of the problem is prepared for transmission to the action coordinator component 102 on the server. At step 704, the management system action component 106 sends the problem report to the workflow generator component 202 of the action coordinator component 102 for further analysis and workflow generation.

Next at step 706, the workflow engine 408 receives the server factored task list for resolving the problem. Proceeding to step 708, the method determines whether the server factored task list requires coordination with the mobile device factored task list. If the server factored task list does not require coordination with the mobile device factored task list then the method proceeds to step 712 and the workflow engine 408 executes the server factored task list at the server's discretion. If the server factored task list requires coordination with the mobile device factored task list then the workflow engine 408 interrogates the information provided with each task for the circumstances required to execute the task list and solve the problem. In either case, after executing the server factored task list, the status report component 406 prepares a task completion report for distribution to the appropriate individuals. The list of appropriate individuals is pre-configured as part of the server configuration.

Figure 8:
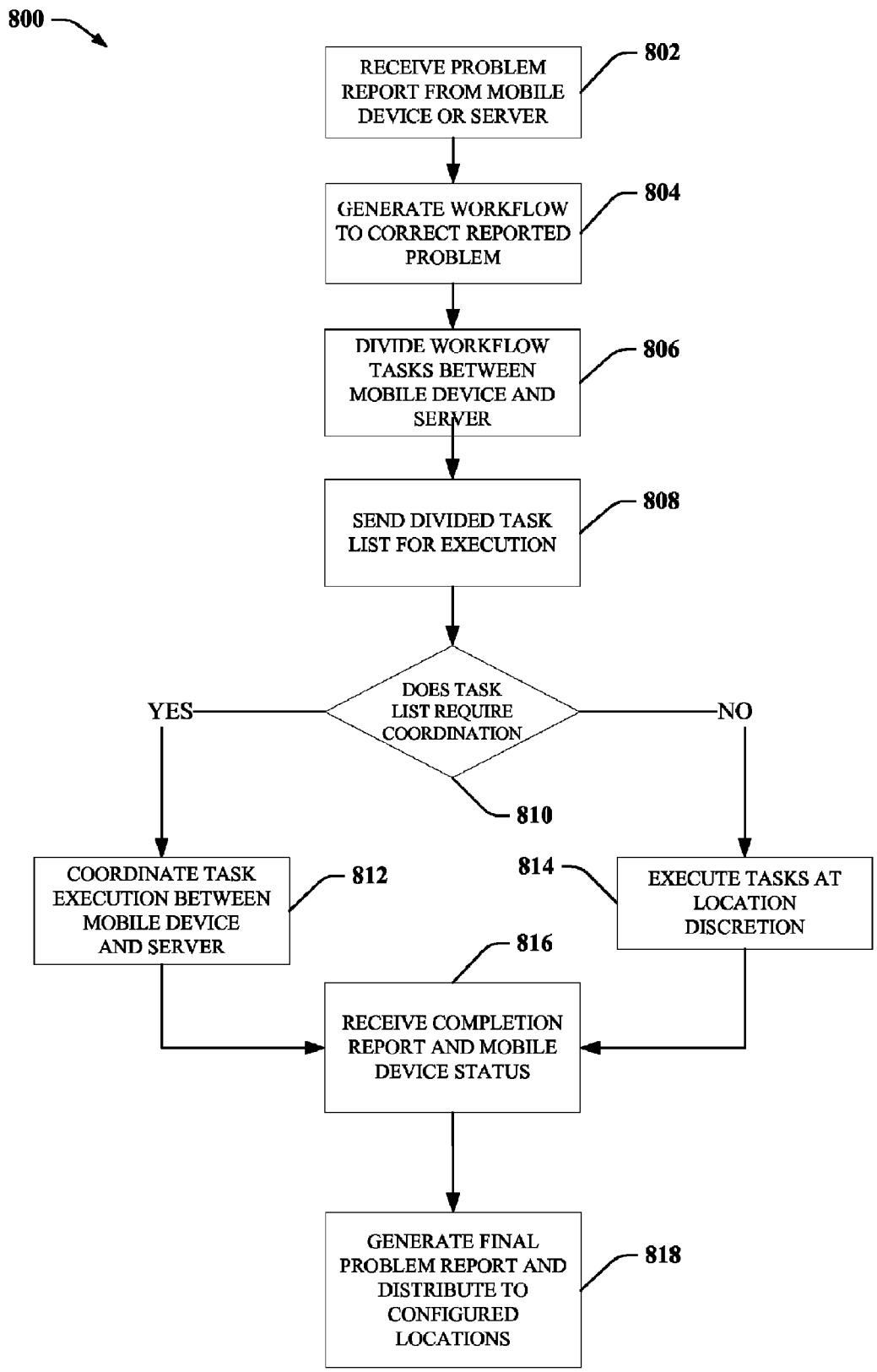
FIG. 8 illustrates an embodiment of a method of the action coordinator on the server analyzing a detected problem and assigning tasks between the mobile device and the server to correct the problem.

Referring next to FIG. 8, illustrated is a method 800 for generating a workflow of tasks factored for a mobile device and a server. Beginning at step 802, the action coordinator component 102 receives a problem report from the mobile device and/or the server. Proceeding to step 804, the workflow generator component 202 generates a workflow to resolve the problem. The method then proceeds to step 806 where the workflow factoring component 204 factors the workflow tasks into a task list for the mobile device and a task list for the server. Proceeding to step 808, the method then sends the factored task lists to their respective locations. The factored task lists include instructions relating to synchronization requirements between the task lists and the workflow coordination component 208 enforces the synchronization between the disparate task lists. It should be noted that the workflow factoring component 204 can factor a workflow task list to a plurality of mobile devices and a plurality of servers.

Next, the method proceeds to step 810 where the mobile device and or the server determine if their factored task list requires coordination. If the factored task list requires coordination then method proceeds to step 812 and the workflow coordination component 208 interacts between the mobile device and the server, receiving status reports at the conclusion of each factored task and notifying the mobile device and/or the server of when to proceed with the next task. If necessary, the workflow coordination component can modify the factored task list of the mobile device and/or the server based on the received status reports. If the factored task list does not require coordination the method proceeds to step 814 and the mobile device and/or the server can execute their respective task list at their discretion. It should be noted that even when the task list does not require coordination, the workflow coordination component still receives status reports from task completion and can modify the factored task list of the mobile device and/or the server based on the information in the status reports.

Proceeding to step 816, the method receives a workflow completion report from the factored task list of the mobile device and/or the server. After receiving all of the workflow completion reports, the method proceeds to step 818 where a final problem report is generated and distributed to all individuals configured to receive the report. In another aspect, the final report is archived for future review and overall system optimization based on analyzing final reports from different servers and different mobile devices.

Figure 9:
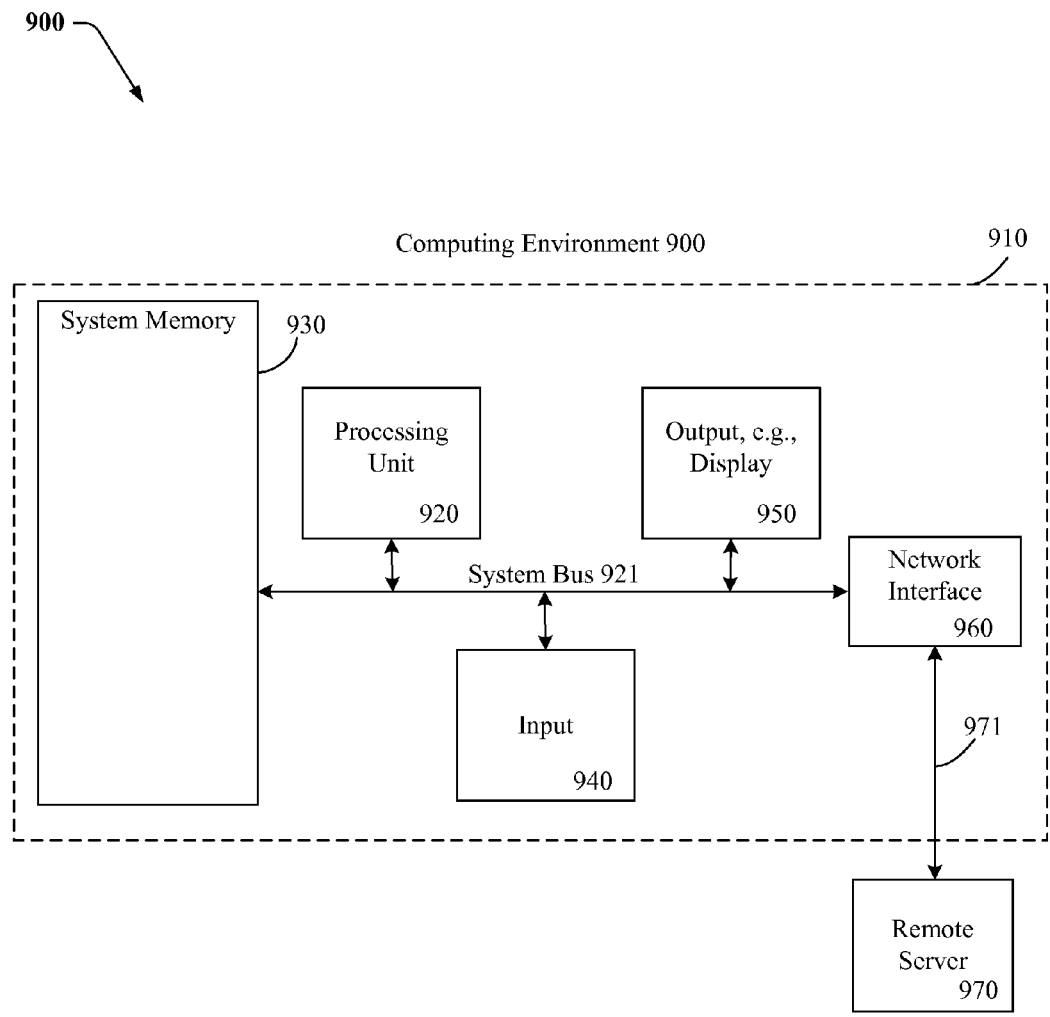
FIG. 9 illustrates a block diagram of an exemplary, non-limiting operating environment in which various aspects described herein can function.

FIG. 9 illustrates an example of a suitable computing system environment 900 implementing the claimed subject matter. Although as made clear above, the computing system environment 900 is only one example of a suitable computing environment for a mobile device and is not intended to suggest any limitation as to the scope of use or functionality of the claimed subject matter. Further, the computing environment 900 is not intended to suggest any dependency or requirement relating to the claimed subject matter and any one or combination of components illustrated in the example operating environment 900.

With reference to FIG. 9, an example of a remote device for implementing various aspects described herein includes a general purpose computing device in the form of a computer 910. Components of computer 910 can include, but are not limited to, a processing unit 920, a system memory 930, and a system bus 921 that couples various system components including the system memory to the processing unit 920. The system bus 921 can be any of several types of bus structures including a memory bus or memory controller, a peripheral bus, and a local bus using any of a variety of bus architectures.

Computer 910 can include a variety of computer readable media. Computer readable media can be any available media accessible by computer 910. By way of example, and not limitation, computer readable media can comprise computer storage media. Computer storage media includes volatile and nonvolatile as well as removable and non-removable media implemented in any method or technology for storage of information such as computer readable instructions, data structures, program modules or other data.

Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 910.

Communication media can embody computer readable instructions, data structures, program modules or other data in a modulated data signal such as a carrier wave or other transport mechanism and can include any suitable information delivery media.

The system memory 930 can include computer storage media in the form of volatile and/or nonvolatile memory such as read only memory (ROM) and/or random access memory (RAM). A basic input/output system (BIOS), containing the basic routines that help to transfer information between elements within computer 910, such as during start-up, can be stored in memory 930. Memory 930 can also contain data and/or program modules that are immediately accessible to and/or presently being operated on by processing unit 920. By way of non-limiting example, memory 930 can also include an operating system, application programs, other program modules, and program data.

The computer 910 can also include other removable/non-removable, volatile/nonvolatile computer storage media. For example, computer 910 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 921 through a non-removable memory interface such as an interface, and a magnetic disk drive or optical disk drive can be connected to the system bus 921 by a removable memory interface, such as an interface.

A user can enter commands and information into the computer 910 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 920 through user input 1040 and associated interface(s) that are coupled to the system bus 921, but can be connected by other interface and bus structures, such as a parallel port, game port or a universal serial bus (USB). A graphics subsystem can also be connected to the system bus 921. In addition, a monitor or other type of display device can be connected to the system bus 921 via an interface, such as output interface 950, which can in turn communicate with video memory. In addition to a monitor, computers can also include other peripheral output devices, such as speakers and/or a printer, which can also be connected through output interface 950.

The computer 910 can operate in a networked or distributed environment using logical connections to one or more other remote computers, such as remote server 970, which can in turn have media capabilities different from device 910. The remote server 970 can be a personal computer, a server, a router, a network PC, a peer device or other common network node, and/or any other remote media consumption or transmission device, and can include any or all of the elements described above relative to the computer 910. The logical connections depicted in FIG. 10 include a network 971, such local area network (LAN) or a wide area network (WAN), but can also include other networks/buses. Such networking environments are commonplace in homes, offices, enterprise-wide computer networks, intranets and the Internet.

When used in a LAN networking environment, the computer 910 connects to the LAN 1071 through a network interface or adapter. When used in a WAN networking environment, the computer 910 can include a communications component, such as a modem, or other means for establishing communications over the WAN, such as the Internet. A communications component, such as a modem, which can be internal or external, connects to the system bus 921 via the user input interface at input 940 and/or other appropriate mechanism. In a networked environment, program modules depicted relative to the computer 910, or portions thereof, can be stored in a remote memory storage device. It should be appreciated that the network connections shown and described are exemplary and other means of establishing a communications link between the computers can be used.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and that any one or more middle layers, such as a management layer, can be provided to communicatively couple to such sub-components in order to provide integrated functionality. Any components described herein may also interact with one or more other components not specifically described herein but generally known by those of skill in the art.

In view of the exemplary systems described supra, methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, can be implemented which achieve the same or a similar result. Moreover, not all illustrated blocks are required to implement the methodologies described hereinafter. In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, no single embodiment shall be considered limiting, but rather the various embodiments and their equivalents should be construed consistently with the breadth, spirit and scope in accordance with the appended claims.

What is claimed is:

1. A system for automatically correcting an operational problem on at least one of a mobile device linked to a server and the server, the system comprising:
    an action coordinator component encoded with instructions, which when executed by a processor in the server generates a workflow task list comprising a plurality of workflow tasks for execution on at least one of mobile device and the server when an operational problem is new and selects an existing workflow task list from a workflow archive when the operational problem previously occurred;
    a mobile device action component encoded with instructions, which when executed by a processor in the mobile device reports an operational problem on the mobile device to the action coordinator component and executes the workflow tasks designated by the action coordinator component on the mobile device; and
    a management system action component encoded with instructions, which when executed by the processor in the server reports an operational problem on at least one of the mobile device and the server to the action coordinator component and executes the workflow tasks designated by the action coordinator component on the server.

2. The system of claim 1, the action coordinator component further comprises a workflow generator component for creating the workflow tasks based on a problem report.

3. The system of claim 1, the action coordinator component further comprises a workflow factoring component for factoring the workflow tasks into factored workflow tasks for the mobile device and factored workflow tasks for the server.

4. The system of claim 3, the mobile device action component further comprises a workflow engine component for executing the factored workflow tasks for the mobile device.

5. The system of claim 1, the action coordinator component further comprises a workflow coordination component for coordinating the execution of the mobile device factored workflow tasks with the server factored workflow tasks.

6. The system of claim 5, the workflow coordination component can update the factored workflow task lists based on feedback from previously executed tasks.

7. The system of claim 1, the action coordinator component further comprises a workflow report component for creating and distributing status reports of the outcome of the workflow problem resolution.

8. The system of claim 1, the mobile device action component further comprises a problem detection component for detecting operational problems on the mobile device.

9. The system of claim 1, the mobile device action component further comprises a problem analysis component for collecting data associated with the operational problem and analyzing the data.

10. The system of claim 9, the problem analysis component further comprises archiving the operational problem data for future analysis.

11. The system of claim 1, the operational problem comprises utilization of the mobile device.

12. The system of claim 1, the mobile device action component further comprises a status report component for transmitting the operational problem data and analysis to the server.

13. The system of claim 1, the management system action component further comprises a problem detection component for detecting operational problems on the server or the mobile device.

14. The system of claim 1, the management system action component further comprises a problem analysis component for collecting data associated with the operational problem and analyzing the data.

15. The system of claim 1, the management system action component further comprises a status report component for transmitting the operational problem data and analysis to a plurality of servers.

16. The system of claim 1, the management system action component further comprises a workflow engine component for executing the factored workflow tasks for the server.

17. The system of claim 1, the action coordinator component and the management system component execute on the same server.

18. A method, stored in a memory and executing on a processor in a device, for automatically correcting an operational problem on at least one of a mobile device linked to a server and the server, the method comprising:

detecting the operational problem on at least one of the mobile device and the server;

collecting and analyzing data associated with the operational problem for transmission to the server;

generating a workflow task list comprising a plurality of workflow tasks for execution on at least one of the mobile device and the server when the operational problem is new;

selects an existing workflow task list from a workflow archive when the operational problem previously occurred;

factoring the workflow task list into a mobile workflow task list for the mobile device and a server workflow task list for the server;

delivering the mobile workflow task list and the server workflow task list to the mobile device and the server, respectively; and coordinating execution of the mobile workflow task list on the mobile device and the server workflow task list on the server.

19. The method of claim 18, the mobile device archives the collected data and analysis if communications to the server is unavailable and transmits the collected data and analysis to the server after communications are reestablished.

20. The method of claim 18, the operational problem is detected from at least one of the mobile device and the server.

\* \* \* \* \*

UNITED STATES PATENT AND TRADEMARK OFFICE
CERTIFICATE OF CORRECTION

PATENT NO. : 8,156,388 B2  Page 1 of 1
APPLICATION NO. : 12/276799
DATED : April 10, 2012
INVENTOR(S) : Herrod It is certified that error appears in the above-identified patent and that said Letters Patent is hereby corrected as shown below:

In Fig. 4, Sheet 4 of 9, delete "  " and insert

-- 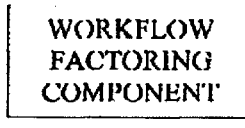 --, therefor.

Signed and Sealed this
First Day of January, 2013

David J. Kappos
*Director of the United States Patent and Trademark Office*